ized Patent [15] 3,703,682
Wickman et al. [45] Nov. 21, 1972

[54] LONG AXIS GRADIOMETER

[72] Inventors: Miles X. Wickman, Edgewater; Harold P. Cohn, Shadyside, both of Md.

[73] Assignee: The United States of America as represented by the Secretary of the Navy

[22] Filed: Oct. 30, 1968

[21] Appl. No.: 771,800

[52] U.S. Cl. ............... 324/43 R, 356/138, 356/152, 356/153, 250/203
[51] Int. Cl. ....................... G01r 33/02, G01b 11/26
[58] Field of Search ..324/43, 47; 356/138, 152, 153, 356/154, 147; 250/203

[56] References Cited

UNITED STATES PATENTS

| 2,352,179 | 6/1944 | Bolsey | 356/153 |
| 2,703,505 | 3/1955 | Senn | 350/152 |
| 2,811,074 | 10/1957 | Davidson | 356/154 |
| 2,966,853 | 1/1961 | Gilfillan, Jr. et al. | 324/43 |
| 3,050,679 | 8/1962 | Schonstedt | 324/43 |
| 3,065,413 | 11/1962 | Ferguson | 324/43 |
| 3,316,800 | 5/1967 | Kibler | 356/152 |

OTHER PUBLICATIONS

Morris et al., Design of Second Harmonic Flux Gate Magnetic Field Gradiometer, The Review of Scientific Instruments; Vol. 32, No. 4, pp. 444–448, April 1961.

Primary Examiner—Benjamin A. Borchelt
Assistant Examiner—R. Kinberg
Attorney—L. A. Miller, Q. E. Hodges and A. Sopp

[57] ABSTRACT

A gradiometer has two magnetometers axially spaced apart by an internally non-reflecting tube. One magnetometer is attached to a light source fixed centrally of a photo multiplier array at one end of the tube. The source transmits collimated or cophasal light to the other end of the tube where it is reflected by a mirror mounted on a two axis gimbal. The other magnetometer is attached to the gimbal. The reflected light returns to the source if the magnetometers are coaxial when the magnetometer axes are not parallel, the reflected light is sensed by the photomultiplier array the outputs of which drive a servo to realign the gimbaled mirror/magnetometer arrangement to parallelism so that sensed earth's field components are eliminated during operational use of the magnetometers as a gradiometer.

5 Claims, 4 Drawing Figures

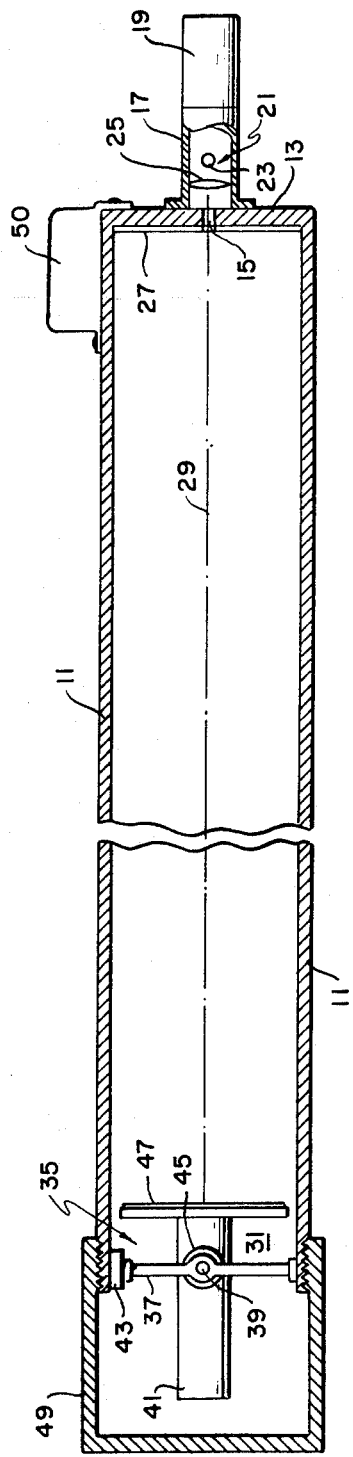
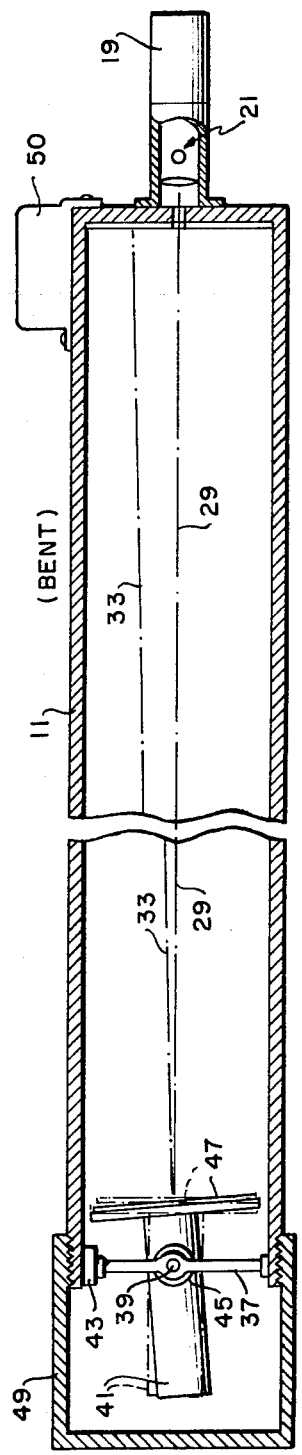

INVENTORS
MILES X. WICKMAN
HAROLD P. COHN

BY
ATTORNEYS

LONG AXIS GRADIOMETER

The invention described herein may be manufactured and used by or for the Government of the United States of America for governmental purposes without the payment of any royalties thereon or therefor.

BACKGROUND AND SUMMARY

A continuing difficulty associated with gradiometers is the provision of accuracy without loss of sensitivity in detecting magnetic objects in the presence of the earth's magnetic field. Use of direct error correcting means such as compensating coils or electrical signals operating on the sensed signals tends to reduce sensitivity. Other approaches, such as that taught in U.S. Pat. No. 2,709,783 issued to D.G.C. Hare on May 31, 1965, recognize the need of parallelism between the magnetometers in a gradiometer. In satisfying the need, means such as motors for rotating the magnetometers and means for filtering or averaging their outputs have been employed. However, in such systems error can be cumulative and exact measurement is limited by virtue of the averaging process. Other prior art systems employing electrical signal error compensation to simulate parallelism are limited in accuracy by the accuracy obtainable in the error signal which itself may contain error due to stray fields and local materials.

The present invention overcomes disadvantages of prior art gradiometers by providing simple and direct means for parallely aligning the two magnetometers of the gradiometer through optical means which produce error signals for re-orienting through servo motors the magnetometers in very accurate coaxial alignment. The alignment is thus carried out essentially independently of magnetic influences and is very accurate and reliable.

Accordingly, the objects of the invention are to provide: an accurate gradiometer, a simple and accurate coaxial alignment arrangement for the two magnetometer elements of a gradiometer; an accurately aligned gradiometer system in which the alignment is accomplished in a manner essentially free of magnetic influence in the generation of error compensating signals.

BRIEF DESCRIPTION OF THE DRAWINGS

The above objects as well as other objects, features and advantages of the present invention will be better understood by reference to the following detailed description and accompanying drawings in which like reference numerals indicate like parts and in which:

FIGS. 1 and 2 are modified views in longitudinal cross section of the preferred embodiment of the invention.

DETAILED DESCRIPTION

Figure 3:
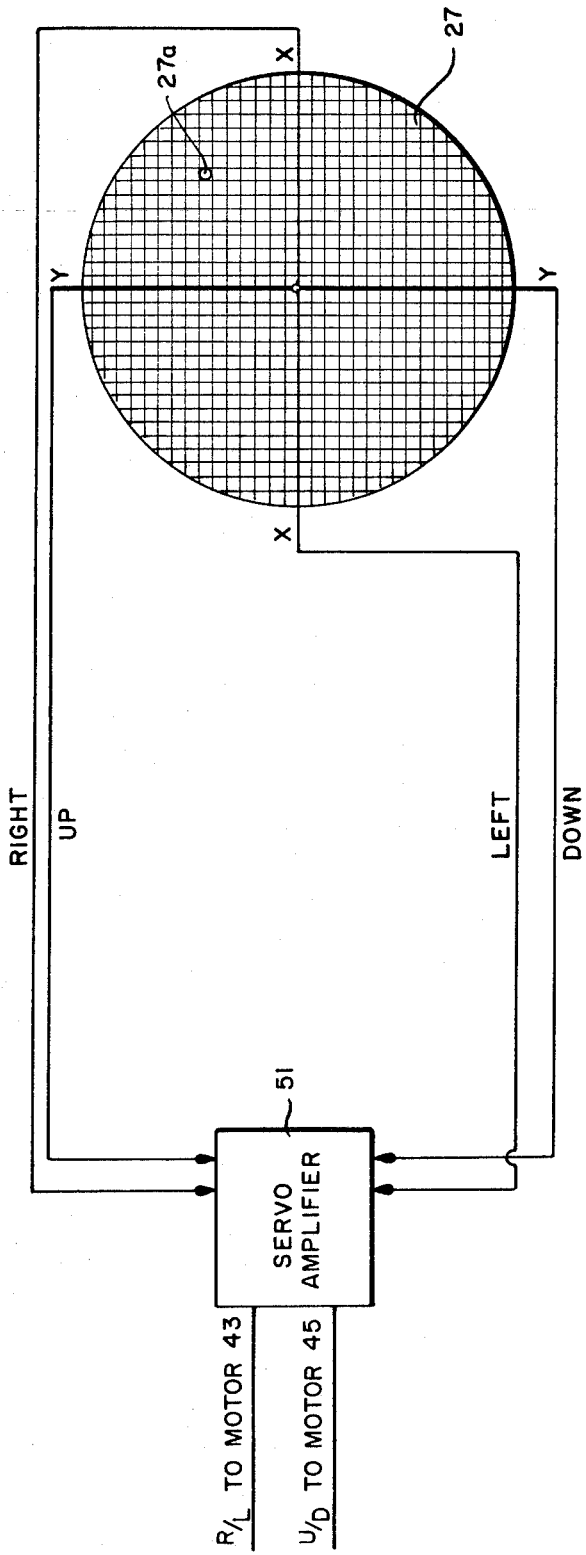
FIGS. 3 and 4 are schematic diagrams of the optical and electrical portions respectively of the embodiment of FIGS. 1 and 2.

Referring to FIG. 1, the gradiometer of the invention comprises a long fluid tight tube 11 closed at one end by a wall 13 having a central axial hole 15 shown in exaggerated size but actually of very small diameter. A housing 17 is attached at its flange to the outer surface of wall 13. At the remote end of the housing 17 is contained a magnetometer 19 having its axis coaxial with the axis of tube 11. The magnetometer may be of any suitable conventional design. The tube 11, wall 13 and housing 17 are preferably made of non-magnetic, rigid material.

Within the near end of housing 17 is an optical unit 21 which may be of any suitable well known design. The unit 21 preferably emits a narrow beam of collimated light. As shown, the unit 21 includes a lamp 23 and collimator 25. Any other suitable light sources such as lasers may be employed as unit 21.

An array 27 of small photoelectric cells or elements such as photomultipliers is mounted on the inner surface of the wall 13 in surrounding relationship to the aperture 15. The array 27 is arranged in any suitable well known manner so that error signals are produced when a reflected beam is detected in a position away from the aperture. The algebraic sign of the voltage may be effected by inverters, etc., to establish both positive and negative sense voltages in an X, Y coordinate system.

The collimated narrow light beam transmitted by the unit 21 is designated by the broken line 29. The path of the beam extends axially through the tube 11 to its other end at which is movably mounted a reflector unit 31. The internal surface of the tube 11 is dull or flat black to prevent internal reflection of the beam. The reflected beam is designated as 33 and may have a path coincident with or divergent from the transmitted beam 29.

The reflector unit 31 comprises a two-axis gimbal 35 having its outer signal 37 mounted for rotation about a Y axis and its inner gimbal 39 mounted for rotation about an X axis perpendicular to Y axis. The Y and X axes respectively may be oriented vertically and horizontally.

A second magnetometer 41 is attached to the inner gimbal 39 for rotation therewith. A servo motor 43 drives outer gimbal 37 and a servo motor 45 drives inner gimbal 39. Suitable reflecting means such as an optically flat mirror 47 is attached to the tube-facing end of the magnetometer 41, the mirror and magnetometer thus moving in unison with the inner gimbal 39 and thus movable with the outer gimbal 37 alone, or with gimbals 37, 39 simultaneously. A cap 49 of non-magnetic material is attached to the other end of the tube 11, as by threaded engagement or in any other suitable manner. Where the gradiometer is to be used under water, the cap 49, tube 11 and wall 13 may provide a watertight closed space in tube 11 for passage of the light beam, and atmosphere, or any other suitable clear gas or gas mixture may be used to fill the tube 11.

The control system of the invention is shown in FIG. 0 AND INCLUDES THE AFOREMENTIONED PHOTOMULTIPLIER ARRAY 0&, THE ELEMENTS OF WHICH ARE ELECTRICALLY CONNECTED IN ANY SUITABLE WELL KNOWN MANNER TO PROVIDE, AS AN AUTOCOLLIMATOR FOR EXAMPLE, OUTPUT SIGNALS PROPORTIONAL IN VALUE AND SENSE TO THE 3, there may be two separate voltage outputs respectively reprsenting ±power source and electrical hardware for thentire gradiometer system may be located in a watertight housing 50 (FIG. 1) mounted on the tube 11, or in any of the suitable location. Theleads extending from housing 50 to the servos 43, 45 may be led along the exterior of the tube and fluidtightly therethrough to the servos.

The control system of the invention is shown in FIG. 3 and includes the aforementioned photomultiplier array 27, the elements of which are electrically connected in any suitable well known manner to provide, as an autocollimator for example, output signals proportional in value and sense toe the ± X and ± Y displacement of the reflected beam 33. The power source and electrical hardware for the entire gradiometer system may be located in a watertight housing 50 (FIG. 1) mounted on the tube 11, or in any other suitable location. The leads extending from housing 50 to the servos 43, 45 may be led along the exterior of the tube and fluidtightly therethrough to the servos.

By way of illustration and not limitation, the array 27 may comprise a plurality of discrete elements, each composed of two photoelectric (PE) units of combined area equal to beam cross sectional area. Thus, for each beam position on the array, e.g., at 27a of FIG. 3, there may be two separate voltage outputs respectively representing ±X and ±Y values which may be transmitted as control signals for each position of the reflected beam. The X axis component displacement of the beam may be positive and negative voltages transmitted as "right" and "left" signals via a servo amplifier 51 to the Y axis gimbal servo 43. Similarly, Y axis positive and negative voltages may be transmitted as "up" and "down" signals via amplifier 51 to servo 45 for movement of the X axis gimbal 39. The negative voltages may be provided by passing the outputs of the PE elements located in negative sense quadrants via inverters, for example.

Of course, any other suitable well known means for autocollimation of optical alignment may be employed, the particular mode of optical means for displacement measurement and error signal generation not being critical to the invention.

OPERATION

Figure 4:
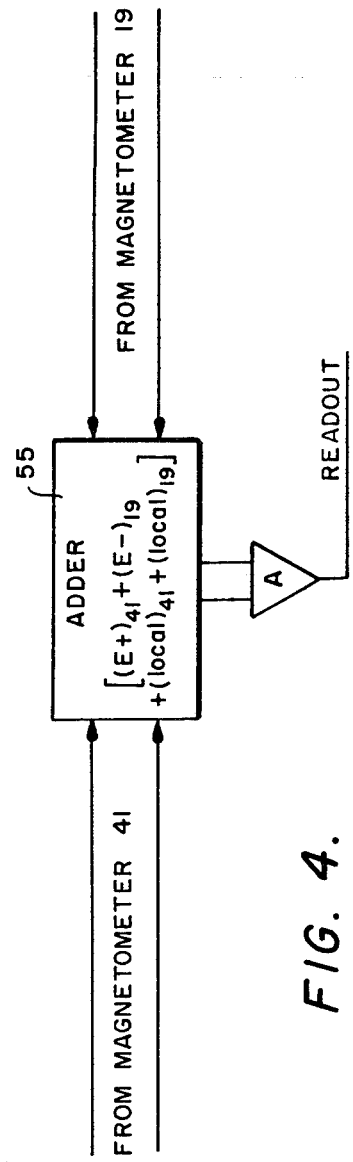

As previously indicated, the purpose of the system is to provide detection and measurement of magnetic fields within earth's magnetic field. Therefore, it is desirable that earth's field effects on magnetometers 19 and 41 cancel each other as exactly as possible. This cancellation is indicated in adder device 55, FIG. 4, in which the outputs of magnetometers 19 and 41, if having windings of opposite senses about their axes, will add as earth's field (E+) and earth's field (E−) to a sum of zero.

Oppositely wound magnetometers 19 and 41 will be additive in adder 55 when they together sense a local magnetic field arising from an object passing therebetween. If the axes magnetometers 19 and 41 are not parallel to each other, their respective sensed earth's fields will be different and thus contribute earth's field error in device 55.

The tube 11 or other support means connecting the two magnetometers will bend, shift, or otherwise be displaced to an appreciable degree. Ordinarily, the tube 11 will be used because it provides a closed space not interfered with by ambient light and other optical anomalies. It is intended that the tube be sufficiently long to bend and to enable detection of magnetic fields accompanying objects passing between magnetometers 19 and 41. Various forces such as wind, current, temperature, etc. will in time act on the magnetometer supports and/or the tube 11 to cause it to bend within its limit of elasticity, thus causing magnetometers 19 and 41 to lose parallelism initially.

As indicated in FIG. 1, when the axes of magnetometers 19 and 41 are coaxial, the light or laser beam 29 is reflected back to the source 23. When the tube bends as shown in FIG. 2, the light beam 29 is initially reflected as beam 33, say, to a point 27a (FIG. 3) on array 27 causing X and Y axis component signal voltages to be generated. These voltages act as error signals for driving servos 43 and 45 to reposition the mirror 47 so that, eventually, beam 33 is coincident with beam 29.

When beams 29 and 33 are coincident, the axes of magnetometers 19 and 41 must be parallel because magnetometer 41 moves in unison with the mirror 47. The axes of magnetometers 19 and 41 will not be both parallel and on the same axis if the tube is bent or curved. Magnetometers 19 and 41 will be coaxial on the same centerline only if the tube 11 is straight. But cancellation of earth's fields in device 55 requires only parallelism of magnetometer axes and not coaxial centerline coincidence of the two magnetometer axes.

It is understood that in operational deployment of the gradiometer, location of power and readout hardware is not critical and such hardware may be remotely located. The only electrical or electromotive equipment employed in situ is the array 27, its electrical output system and leads to the servo motors at the gimbals. The servo motors 43 and 45, if electrical and not fluidic or hydraulic, may be shielded as appropriate to minimize their magnetic field effect on the magnetometer 41.

It is also understood that employment of a closed tube connecting the two magnetometers insures interference-free optical coupling, lack of visual detectability, and an imposable limit to the extent of relative displacement of the magnetometers. The further apart the two magnetometers are spaced, the stronger (i.e., stiffer) the tube can be made. Longitudinal stiffeners and base-mounted supports may be used to make the tube 11 more rigid. For example, where the gradiometer is to be used under water, the tube ends or tube portions intermediate the ends may be supported by anchored pedestals. Should the gradiometer be laid directly on the floor of a body of water, the presence of the tube enables operation of the system even though covered by sediment or sand. In certain situations, the use of a tube interconnecting the magnetometers may not be necessary, however.

It is to be understood that the invention is not limited to the exact details of the construction shown and described for obvious modifications will occur to persons skilled in the art.

What is claimed is:

1. In a gradiometer, apparatus for aligning the two axially spaced apart first and second magnetometers thereof so that their axes are essentially exactly parallel whereby the effects of earth's magnetic field on both magnetometers are the same comprising:

means mounting the first and second magnetometers substantially coaxially and spaced apart;

light source means supported coaxially with the first magnetometer for transmitting a beam of light;

reflecting means supported with the second magnetometer for reflecting the transmitted beam;

servo motor means for moving said magnetometers relatively to each other responsive to error signals;

light responsive means located in fixed relation to said light source for producing, in response to impingement of the beam of light reflected thereon, error signals indicative of displacement of the reflected beam from the transmitted beam, and thus error signals indicative of the existence of and extent of non-parallelism of the axes of the magnetometers; and means for feeding the error signals to said servo motor means whereby the servo motor means moves said reflecting means to bring both light beams into coincidence thereby parallelly aligning the magnetometer axes.

2. Apparatus according to claim 1 wherein said means mounting the first and second magnetometers comprises a tube free of internal reflection enclosing the transmitted and reflected light beams.

3. Apparatus in accordance with claim 2 wherein said servo motor means is mounted at one end of the tube for driving the second magnetometer and reflecting means in unison therewith about two perpendicular axes, the first magnetometer being affixed to the other end of the tube for movement therewith.

4. Apparatus in accordance with claims 2 or 3 in which the tube is watertight.

5. Apparatus in accordance with claim 1 or 2 or 3 wherein said light responsive means comprises an array of photoelectric elements lying in a plane transverse to the axis of the first magnetometer in surrounding relation to said light source.

* * * * *